United States Patent [19]

Straneo et al.

[11] Patent Number: 5,637,649
[45] Date of Patent: Jun. 10, 1997

[54] CONTINUOUS PROCESS AND APPARATUS FOR THE HALOGENATION OF ELASTOMERS

[75] Inventors: Paolo Straneo; Carlo Maffezzoni; Alfredo Marchegiano; Enrico Moretti; Amabile Penati, all of Milan, Italy

[73] Assignee: Pressindustria A.G., Lugano, Switzerland

[21] Appl. No.: 446,840

[22] PCT Filed: Dec. 10, 1993

[86] PCT No.: PCT/EP93/03552

§ 371 Date: Jun. 1, 1995

§ 102(e) Date: Jun. 1, 1995

[87] PCT Pub. No.: WO94/18244

PCT Pub. Date: Aug. 18, 1994

[30] Foreign Application Priority Data

Feb. 10, 1993 [IT] Italy .................................. TO93A0081

[51] Int. Cl.⁶ ........................................................ C08F 8/22

[52] U.S. Cl. .................... 525/356; 515/332.8; 515/332.9; 515/333.1; 515/333.2; 515/334.1

[58] Field of Search ............................................... 525/356

[56] References Cited

U.S. PATENT DOCUMENTS 3,966,692 6/1976 Driscoll et al. .

*Primary Examiner*—Bernard Lipman
*Attorney, Agent, or Firm*—Keil & Weinkauf

[57] ABSTRACT

A process for the continuous halogenation of elastomers, in which a halogenating agent is introduced into a solution of an unsaturated elastomer in an organic solvent, is disclosed. The process is characterized in that it consists of mixing the halogenating agent in a continuous stream of the elastomer solution, thereby dissolving the halogenating agent which reacts with the elastomer in the same continuous stream, and is further characterized by keeping the continuous stream of the elastomer solution in turbulent motion without flow inversion phenomena during the course of the reaction between the halogenating agent and the elastomer.

17 Claims, 1 Drawing Sheet

CONTINUOUS PROCESS AND APPARATUS FOR THE HALOGENATION OF ELASTOMERS

The present invention relates to a continuous process for the halogenation of elastomers and more particularly concerns a continuous process of halogenation of an unsaturated elastomer dissolved in an organic solvent. The invention furthermore concerns an apparatus for performing this process.

The known techniques of halogenation of elastomers require the mixing and distribution of gaseous or liquid halogen in a highly viscous solution of an elastomer. This is conventionally effected by means of a so-called batch process, in which considerable consumption of energy is required for stirring the viscous mass. To avoid high local concentrations of halogen, the addition is very slow, with low productivity and continuous expenditure of mixing energy. In spite of various technical expedients adopted, the quality of the product suffers from the non-homogeneous dispersion of the halogen in the whole of the stirred mass.

A continuous process for the halogenation of highly viscous solutions has been proposed, so as to avoid certain disadvantages of the abovementioned batch process.

U.S. Pat. No. 3,966,692 has described a process for the halogenation of elastomer solutions of high viscosity (from 1500 to 6000 cps) which are made to flow through a pipe in such a way that the Reynolds number is less than 100, the process being carried out under pressure, so as to assist the dissolution of the halogen and avoid the formation of gas bubbles, which would interfere with the laminar character of the flow.

The inventors of the present invention have now found that the use of a stream of an elastomer solution of lower viscosity (for example <1000 cps), kept in turbulent motion and avoiding flow inversion phenomena, makes it possible to improve the dispersion and diffusion of the halogen, avoiding high local concentrations of halogen which result in significant degradation of the elastomer chain.

Accordingly, the main object of the present invention is to provide a process for the halogenation of elastomers which permits the dispersion and diffusion of the halogen to be improved whilst avoiding high local concentrations of the said halogen. The invention furthermore proposes to provide an apparatus for performing the abovementioned process.

In accordance with these objects, the present invention provides a continuous process for the halogenation of elastomers, in which a halogenating agent is introduced into a solution of an elastomer in an organic solvent, essentially characterised in that it consists in mixing the said halogenating agent in a continuous stream of the said elastomer solution, thus dissolving the said halogenating agent and causing it to react with the said elastomer in the same continuous stream, and in keeping the said continuous stream of the elastomer solution in turbulent motion during the course of the reaction between the said halogenating agent and the said elastomer.

In the apparatus for performing the abovementioned process, the turbulence of the solution is assisted by means of mechanical means which promote turbulence, which means may be static or dynamic, such as Raschig rings inserted into a pipe such as a column reactor, in which the organic solution of the elastomer is caused to flow continuously.

Advantageously, an inert gas is added to the said elastomer solution, in order to assist the dispersion of the halogen, increase the turbulence and reduce the local concentrations of halogenating agent and of the halogenidric acid thus formed.

The addition of the halogenating agent to the continuous stream of the said elastomer solution is carried out at atmospheric pressure, given the high speed of the reaction under the operating conditions employed.

Further advantageous features of the present invention will emerge from the claims, which are understood to be fully incorporated herein.

By means of the process according to the invention the local concentration of halogen is reduced and the distribution and diffusion of the same is increased, thus giving a more homogeneous and consistent halogenated product. The local excess of halogen is avoided and the degradation of the elastomer chain is hampered. The viscosity of the solution does not vary significantly after the halogenation. The presence of the inert gas assists the evolution of the halogenidric acid formed.

BRIEF DESCRIPTION OF THE DRAWING

The FIGURE is a schematic view for performing the process according to the instant invention.

DETAILED DESCRIPTION OF THE INVENTION

Figure 1:
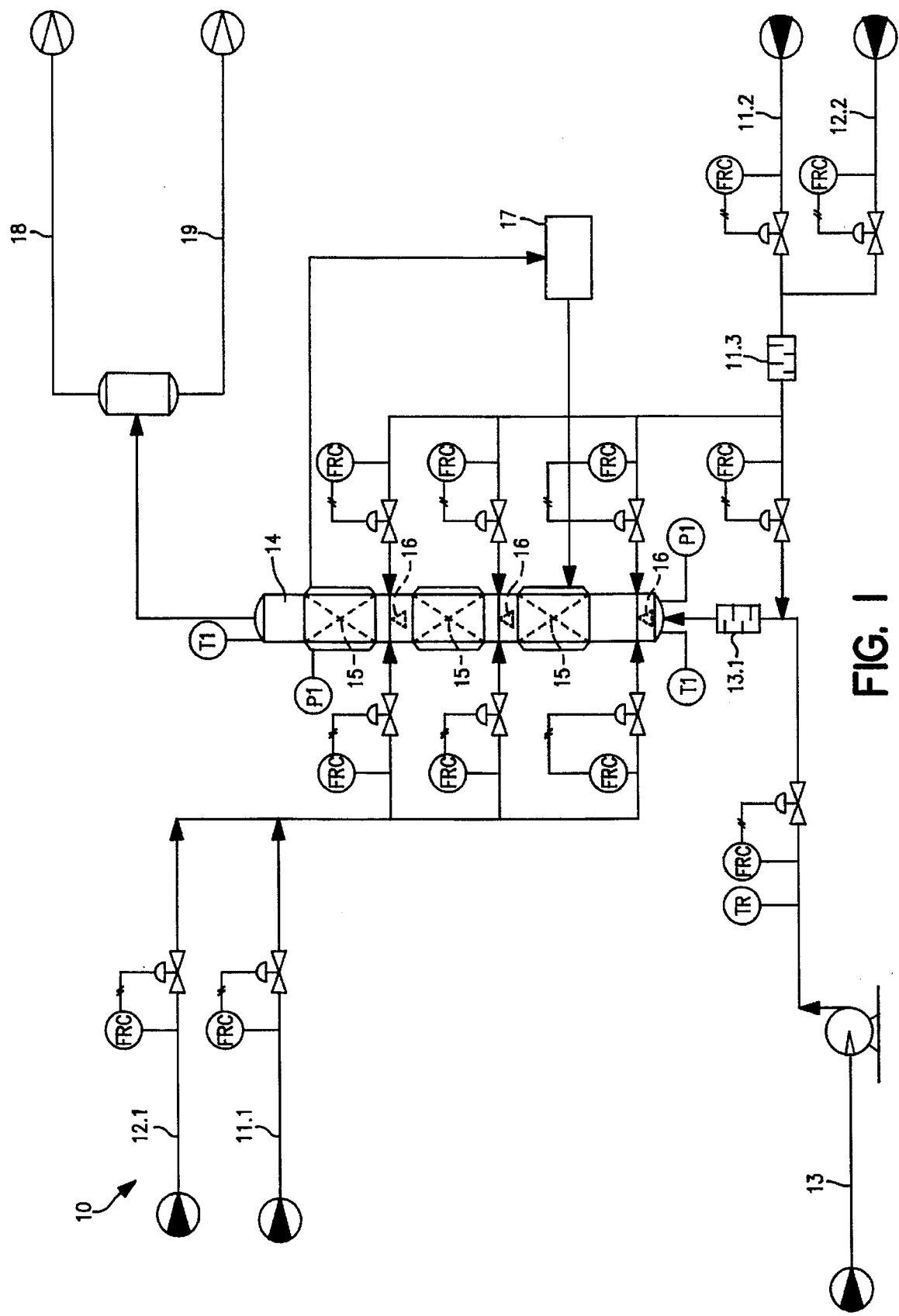

The present invention is described in detail in the text which follows, with reference to the attached drawing, given by way of example, in which the single FIGURE is a schematic view of an embodiment of an apparatus for performing the process according to the invention.

The apparatus, according to the invention, for the halogenation of the elastomers is indicated as a whole by 10 and is intended to operate either with a gaseous halogenating agent, such as chlorine, fed in through an introduction line 11.1, or —alternatively—with a liquid halogenating agent, such as bromine, fed in through an introduction line 11.2. 12.1 and 12.2 indicate the lines for introducing the agents for diluting the halogenating agents: an inert gas for chlorine and for bromine (line 12.1) and an organic solvent for bromine (line 12.2). 13 indicates a line for introducing a solution of an unsaturated elastomer in an organic solvent.

The organic solution of the unsaturated elastomer to be halogenated is caused to flow upwards in a tubular column 14, constituting a reactor, in which is placed a plurality of Raschig rings 15 or similar, static or dynamic, means for promoting turbulence.

The gaseous halogen is introduced into the column reactor 14 via distributors 16, located immediately upstream—according to the direction of flow of the elastomer solution—from each bed of Raschig rings. The gaseous stream of halogen is subdivided via a plurality of distributors 16, so as to dilute the local amount of halogen introduced into the reactor 14.

Alternatively, the gaseous stream of halogen is introduced into the reactor 14 by means of a single distributor 16.

The choice of the distributor or distributors 16 for introducing the gaseous halogen into the column reactor 14, from the bottom to the top thereof, changes the residence time in the said reactor of the elastomer solution before degassing takes place.

The stream of gaseous halogen can be diluted, as stated, with an inert gas such as nitrogen. In that case, greater turbulence in the reactor 14 results and the dispersion of the halogen is assisted.

17 indicates a thermostat which permits thermostating the reactor 14 to the desired temperature, so as to keep constant the viscosity of the solution, the diffusion of the gas within the solution and the reaction velocity. This contributes substantially to obtaining a product which is uniform and consistent with time.

The system does not have to be kept under superatmospheric pressure, which simplifies the degassing on leaving the reactor 14.

18 indicates the discharge line for the gases leaving the reactor 14, and 19 indicates the discharge line of the halogenated elastomer solution obtained on leaving the reactor 14.

As indicated, the apparatus 10 is also suitable for the use of a liquid halogenating agent, such as bromine (feed line 11.2).

In that case, to assist the dispersion of the halogen in the elastomer solution, it is preferable first to dilute the bromine with a suitable solvent (feed line 12.2) by means of the mixer 11.3 and to introduce the said mixture into the reactor 14 upstream—in the sense of the flow of the elastomer solution—from each bed of Raschig rings 15, or in a suitable mixer 13.1 immediately upstream from the reactor 14.

Turbulence is created immediately and excellent dispersion of the bromine in the elastomer solution is achieved. The turbulence can be increased by introducing inert gas into the reactor 14 via the distributors 16.

The following references are additionally used in the single FIGURE of the attached drawing:

FRC : flow meter
TR : temperature recorder
TI : temperature indicator
PI : pressure indicator.

Although the process according to the invention can be performed with any elastomer which can react with halogens and which can be dispersed in an inert organic solvent, in a particularly advantageous embodiment the said process is applicable to the halogenation of butyl rubber either with chlorine or with bromine. This rubber is very soluble in hexane but many other solvents can also be used for the same purpose. For simplicity, and without implying a limitation, the text which follows will refer to the chlorination or bromination of butyl rubber, which has been dissolved in hexane.

For better performance of the process according to the invention it is advantageous that the viscosity of the butyl rubber dissolved in hexane should not exceed 1000 cps but should preferably be between 100 and 500 cps. This is easily achieved with butyl rubber concentrations of the order of 10% in hexane. Given that, at a particular temperature, the viscosity of the polymer solutions is a function of the molecular weight as well as of the concentration, it is necessary, when varying the grades of butyl rubber, to adjust the concentration so as to have a suitable viscosity. If the viscosity is lowered excessively, the turbulence, the dispersion and the diffusion of the halogen are improved but the productivity is lowered. Raising the viscosity excessively has the opposite effect. When butyl rubber is halogenated with chlorine or bromine, the temperature should be kept at between 10° and 40° C.

The amount of halogen introduced for reacting with the unsaturation of the butyl rubber is proportional to the degree of unsaturation. If account is taken of the equation:

$$X = \frac{M3\,L}{(100-L)M1 + L(M2+M3)} \times 100$$

in which:

X=percent (%) by weight of halogen in the halogenated polymer;
L=percent (%) in moles of the diolefin in the butyl rubber;
M1=molecular weight of the olefin in the butyl rubber;
M2=molecular weight of the diolefin in the butyl rubber and
M3=molecular weight of the halogen and of the fact that for industrial uses the halogen content varies from 0.5% to X, the halogen introduced must be twice this amount relative to the elastomer. Greater amounts of halogen are not advisable because, as is known, they lead to degradation of the product. Furthermore, if the halogen is chlorine, the chlorinated elastomer must contain not more than one atom of chlorine per double bond of the elastomer.

As stated, the halogen can be introduced from a single distributor 16 or from a plurality of distributors 16 at various heights in the column 14. In the latter case, locally increased concentrations of halogen are avoided, leading to a halogenated product of a higher quality. The best dispersion of halogen is assisted by dilution. Where chlorine is used, it is preferable to dilute it with an inert gas such as nitrogen or others, chosen as desired. The ratio of inert gas/chlorine can be varied at will, taking account of the fact that increasing the said ratio assists turbulence, dispersion of the halogen and degassing but, at the same time, consumption and dimensions are increased. It has been found that a volumetric ratio of nitrogen/chlorine of about 4 or 5 is an excellent compromise, without however limiting the process according to the invention.

Where a liquid halogen, such as bromine, is used, the halogen can be added in amounts related to the unsaturation of the elastomer. To improve the dispersion it is advantageous to carry out a pre-dilution with varying amounts of a solvent, preferably the same solvent as that used to dilute the elastomer. A dilution to 10% can be optimal, but obviously does not impose a limitation on the process according to the invention.

This dilution can be effected by means of any apparatus adapted to give good mixing, for example a static mixer 11.3.

The bromine thus diluted can be added at one or more points of the column reactor 14, or immediately upstream from the latter—in the direction of the flow of the elastomer solution—in a suitable mixer, such as the mixer 13.1. To assist turbulence, dispersion and degassing, it is convenient also to introduce an inert gas via the distributors 16.

The reaction time required to complete the halogenation reaction depends on the temperature, and on the type and concentration of the elastomer and of the halogen. The length of the reaction column 14 can however be varied so as to make the reaction go to completion.

Using the process according to the invention, which assists the dispersion and diffusion of the halogen, it has been found that a residence time in the reaction column of about 30 seconds can be sufficient and that a time of about 120 seconds can normally be used. These values are obviously not to be understood as limiting the process according to the invention.

The presence of inert gas and the fact that the process is carried out at atmospheric pressure assist the final degassing in which the hydrochloric acid or hydrobromic acid formed, and any unreacted halogen, are removed from the solution, avoiding possible subsequent undesired halogenations before the solution of halogenated rubber is washed.

Washing with water after the degassing can be sufficient to remove all traces of acid and of unreacted halogen. However, a final wash with an alkaline solution is advisable. In that case, the consumption of the neutralising solution is greatly reduced.

Among the various methods for removing the organic solvent from the halogenated rubber, the method which consists in vaporising and separating off the solvent by passing the solution into stirred hot water is preferred, given the low viscosity and concentration of the solution.

EXAMPLES OF PERFORMING THE INVENTION

The examples which follow are given in order to illustrate the invention more clearly.

EXAMPLE NO. 1

The reaction between chlorine and a butyl rubber solution was carried out in the apparatus 10.

The reactor 14 was made of glass and consisted of tubular units superposed to form a column. Each unit had an internal diameter of 20 mm and a height of 150 mm and was provided with a distributor 16 and a layer of glass Raschig rings 15 of dimensions 5×5 mm.

To carry out the experiments described below, three tubular elements, superposed to form the tubular column reactor 14, were used. The distributors 16 consisted of type G 4 glass frits.

The butyl rubber used had a viscosimetric molecular weight of about 500,000 and an unsaturation of 2.3%.

A 12.3% solution of butyl rubber in hexane, having a viscosity of 450 cps and at a temperature of 30° C., was introduced into the bottom of the reactor 14 at a feed rate of 4 l/h.

The chlorine was introduced only from the first distributor 16—with reference to the direction of the flow of the elastomer solution—after having been diluted with nitrogen beforehand.

The feed rates were respectively 2.5 Nl/h of chlorine and 12 Nl/h of nitrogen.

Under these conditions high turbulence developed in the reactor 14. With these feed rates, the residence time of the hexane solution in the reactor 14 was 2 minutes before degassing.

The rubber obtained had a chlorine content of 1.15% whilst the viscosimetric molecular weight was reduced by 2.2%.

EXAMPLE NO. 2

The experiment of Example No. 1 was repeated, but the same gas mixture (divided into two equal parts) was introduced simultaneously from the first and second distributor 16 of the reactor 14—with reference to the direction of flow of the elastomer solution.

The rubber obtained showed no reduction in the molecular weight whilst the chlorine content was 1.2%.

EXAMPLE NO. 3

The rubber used had a viscosimetric molecular weight of about 390,000 and an unsaturation of 2%.

An 11.3% solution was prepared and was introduced into the reactor 14 at a feed rate of 6 l/h, at 25° C. Under these conditions, the viscosity of the solution was 340 cps.

The gas mixture was obtained by diluting 3 Nl/h of chlorine with 3 Nl/h of nitrogen and was introduced from the third distributor 16—with reference to the direction of flow of the elastomer solution.

The residence time in the reaction zone of the column 14 before degassing was 30 seconds under these conditions.

The rubber obtained had a chlorine content of 1.10% and the molecular weight showed a reduction of 10%.

The Mooney viscosity ML 1+8 (125° C.) changed from 53.5 to 47.5.

EXAMPLE NO. 4

A butyl rubber having a viscosimetric molecular weight of 440,000, with an unsaturation of 3%, was used.

A 9.8% solution in hexane was prepared. This solution was introduced into the reactor at a temperature of 17° C. with a feed rate of 6 l/h. Under these conditions, the viscosity was 220 cps.

The gas mixture was obtained by diluting 4 Nl/h of chlorine with 20 Nl/h of nitrogen and was introduced from the second distributor 16—with reference to the direction of flow of the elastomer solution.

The residence time in the reaction zone before degassing was 60 seconds under these conditions.

The rubber obtained had a chlorine content of 1.38%. The molecular weight fell by 5%. The Mooney viscosity ML 1+8 (125° C.) changed from 52.5 to 51.5.

EXAMPLE NO. 5

A butyl rubber having a viscosimetric molecular weight of 420,000, with an unsaturation of 2.6%, was used. A 9.8% solution was prepared and was introduced into the reactor 14 at a feed rate of 6 l/h at 25° C. Under these conditions the viscosity of the solution was 180 cps.

Bromine was added to the solution with a feed rate of 20 g/h of bromine diluted to 10% in hexane. The bromine solution was fed from the second distributor 16—with reference to the direction of flow of the elastomer solution— together with 17 Nl/h of nitrogen. The residence time in the reaction zone of the column 14 before degassing was about 1 minute under these conditions.

The rubber obtained had a bromine content of 2.25% and the viscosimetric molecular weight showed a reduction of 15%. The Mooney viscosity ML 1+8 (125° C.) changed from 52 to 44.

EXAMPLE NO. 6

A butyl rubber having a viscosimetric molecular weight of 420,000, with an unsaturation of 2.0%, was used.

A 9.8% solution was prepared and was introduced into the reactor at a feed rate of 6 l/h at 25° C. Under these conditions the viscosity of the solution was 180 cps.

Undiluted bromine was added to the solution at a feed rate of 18 g/h, the bromine being fed from the first distributor 16—with reference to the direction of flow of the elastomer solution—together with 17 Nl/h of nitrogen. The residence time in the reaction zone before degassing was about 90 seconds under these conditions.

The rubber obtained had a bromine content of 1.90% and the viscosimetric molecular weight fell by 20%.

The Mooney viscosity ML 1+8 (125° C.) changed from 52 to 37.

It is understood that the present invention relates to any process and apparatus, such as those claimed below, which, when using the teachings set forth above, leads to the same technical effects.

We claim:

1. Continuous process for the halogenation of elastomers, in which a halogenating agent is introduced into a solution of an unsaturated elastomer in an organic solvent, characterised in that it consists in mixing the said halogenating agent in a continuous stream of the said elastomer solution, thus dissolving the said halogenating agent and causing it to react with the said elastomer in the same continuous stream, and in keeping the said continuous stream of the elastomer solution in turbulent motion without flow inversion phenomena during the course of the reaction between the said halogenating agent and the said elastomer.

2. Process according to claim 1, in which the elastomer is butyl rubber and the halogenating agent is chlorine.

3. Process according to claim 1, in which the elastomer is butyl rubber and the halogenating agent is bromine.

4. Process according to claim 1, in which the stream of the elastomer solution is at a temperature greater than 10° C. during the dissolution and reaction of the halogenating agent.

5. Process according to claim 4, in which the stream of the elastomer solution is at a temperature of between 10° C. and 40° C.

6. Process according to claim 1, in which the organic solvent is hexane and the elastomer solution is, during the dissolution and reaction of the halogenating agent, at a temperature of between 10° C. and 40° C.

7. Process according to claim 1, in which the viscosity of the elastomer solution is below 1000 cps and is preferably between 100 and 500 cps.

8. Process according to claim 2, in which the chlorine is diluted with an inert gas, such as nitrogen, preferably before it is introduced into the continuous stream of the elastomer solution, in a ratio of nitrogen/chlorine of from 1:1 v/v to 10:1 v/v, preferably of 5:1.

9. Process according to claim 2, in which an amount of chlorine is introduced into the elastomer solution such that the chlorinated elastomer contains at least 0.5% of chlorine and not more than one atom of chlorine per double bond of the elastomer.

10. Process according to claim 3, in which an amount of bromine is introduced into the elastomer solution such that the brominated elastomer contains at least 0.5% of bromine.

11. Process according to claim 3, in which the organic solvent is hexane and the bromine is diluted with the said organic solvent.

12. Process according to claim 1, in which an inert gas is introduced into said continuous stream of elastomer solution in order to increase the turbulence and the final degassing.

13. Process according to claim 1, characterised in that the continuous stream of the said elastomer solution is kept at atmospheric pressure during the dissolution and reaction of the halogenating agent.

14. Process according to claim 1, in which mechanical means promote turbulence, said mechanical means being static or dynamic, said mechanical means being placed in the continuous stream of elastomer solution in order to maintain the turbulent motion of said solution.

15. The process according to claim 12 in which the inert gas is nitrogen.

16. The process according to claim 14 in which the mechanical means are Raschig rings.

17. The process according to claim 14 in which the reactor is a column reactor and the mechanical means are Raschig rings.

* * * * *

UNITED STATES PATENT AND TRADEMARK OFFICE
CERTIFICATE OF CORRECTION

PATENT NO.: 5,637,649.

DATED: June 10, 1997

INVENTOR(S): STRANEO et al.

It is certified that error appears in the above-identified patent and that said Letters Patent is hereby corrected as shown below:

Claim 17 (column 8, lines 28-30) should read:

--17. The process according to claim 16 in which said Raschig rings are placed in a column reactor.--

Signed and Sealed this

Thirtieth Day of December, 1997

Attest:

BRUCE LEHMAN

Attesting Officer

Commissioner of Patents and Trademarks